United States Patent
Green

(10) Patent No.: US 9,128,516 B1
(45) Date of Patent: Sep. 8, 2015

(54) COMPUTER-GENERATED IMAGERY USING HIERARCHICAL MODELS AND RIGGING

(71) Applicant: Pixar, Emeryville, CA (US)

(72) Inventor: Brian Green, Emeryville, CA (US)

(73) Assignee: PIXAR, Emeryville, CA (US)

( * ) Notice: Subject to any disclaimer, the term of this patent is extended or adjusted under 35 U.S.C. 154(b) by 173 days.

(21) Appl. No.: 13/789,572

(22) Filed: Mar. 7, 2013

(51) Int. Cl.
- *G06F 3/048* (2013.01)
- *G06F 9/44* (2006.01)
- *G06F 3/01* (2006.01)
- *G05B 19/042* (2006.01)
- *G06F 3/0481* (2013.01)

(52) U.S. Cl.
CPC .. *G06F 3/01* (2013.01); *G06F 8/34* (2013.01); *G05B 19/0426* (2013.01); *G06F 3/0481* (2013.01)

(58) Field of Classification Search
CPC ..... G06F 8/34; G06F 3/0481; G06F 3/04847; G05B 19/0426; G05B 2219/23258
USPC .................................. 715/771, 782, 848, 852
See application file for complete search history.

(56) References Cited

U.S. PATENT DOCUMENTS

| | | | | |
|---|---|---|---|---|
| 6,026,377 | A * | 2/2000 | Burke | 705/27.2 |
| 6,389,375 | B1 * | 5/2002 | Thomsen et al. | 703/2 |
| 7,792,801 | B2 * | 9/2010 | Hamilton et al. | 707/655 |
| 7,904,323 | B2 * | 3/2011 | Wynn et al. | 715/751 |
| 2007/0192727 | A1 * | 8/2007 | Finley et al. | 715/781 |
| 2008/0034326 | A1 * | 2/2008 | Chiu et al. | 715/849 |
| 2009/0106671 | A1 * | 4/2009 | Olson et al. | 715/757 |
| 2009/0125481 | A1 * | 5/2009 | Mendes da Costa et al. | 707/3 |
| 2009/0318224 | A1 * | 12/2009 | Ealey | 463/31 |
| 2011/0185057 | A1 * | 7/2011 | Waugaman et al. | 709/224 |

OTHER PUBLICATIONS

DAZ 3D, Inc.; DAZ Studio, May 26, 2009 Revision C. http://docs.daz3d.com/lib/exe/fetch.php/artzone/pub/software/dazstudio/daz_studio_3_user_guide_052609.pdf.*

* cited by examiner

*Primary Examiner* — Nicholas Augustine
(74) *Attorney, Agent, or Firm* — Kilpatrick Townsend & Stockton LLP

(57) ABSTRACT

Systems and methods for design and use of models can have models with rigging, controls, avars, etc., but can also have controls that are themselves models, thus leading to a hierarchy of models and rigging usable for controlling models in an animation system wherein models correspond to elements or objects for which computer-generated graphics are to be rendered.

21 Claims, 8 Drawing Sheets

COMPUTER-GENERATED IMAGERY USING HIERARCHICAL MODELS AND RIGGING

BACKGROUND

This disclosure relates to computer animation and computer generated imagery. More specifically, this disclosure relates to systems and methods for creating and using hierarchies of models for rigging.

Computer-generated imagery ("CGI") is a process of using computers to convert specifications of objects, things, lights, effects, etc. into images. CGI might be used for generating one image, for example, of a teapot with one light source, or might be used to generate an animation, a sequence of images such as might be used for a feature-length film.

Many computer graphic images are created by mathematically modeling the interaction of light with a three dimensional scene from a given viewpoint. This process, called rendering, generates a two-dimensional image of the scene from the given viewpoint, and is analogous to taking a photograph of a real-world scene. Animated sequences can be created by rendering a sequence of images of a scene as the scene is gradually changed over time. A great deal of effort has been devoted to making realistic looking rendered images and animations.

Some animation might be done by manually painting each image, but with the wide use of computers, it is common, for movies or other features, to have a user (e.g., an animator or other skilled artist) specify geometric descriptions of models or other objects, such as characters, props, background, or the like that may be rendered into images. An animator may also specify poses and motions for objects or portions of the objects. In some instances, the geometric description of objects may include a number of animation variables (avars), and values for the avars. As an example, a simple character might comprise a model that comprises a fixed body, two arms and two legs, with four joints where the arms and legs join the body and can be moved. An animation variable for such a model might be the angle between the body and the right arm. The animator could "pose" this model by placing the body at a location and an orientation in the virtual three-dimensional space, then specifying the four angles (two arm rotations and two leg rotations). This posing might be done by the animator typing in values for each degree of freedom and viewing a rendering of the result.

In such a simple case, entering in a few values is not a problem, but many models are much more complicated. For example, a character model might include a movable body, arms, elbows, fingers, facial muscles, etc., all with their own degrees of freedom. To simplify the entry of the animator's desired pose and/or movements, a user interface with "handles" or "widgets" for avars might be provided. As an example, a user interface might display a rendered character and overlay yellow squares that the animator can drag and move to indicate movements desired by the animator. Internally, the animation editing software that presents the user interface to the user and receives the animator's inputs could translate a "drag-handle" operation into a change in value of an avar.

In some animation terminology, a model refers to a collection of elements that together form an object that is presented in a scene and may have some degrees of freedom. The number of degrees of freedom may depend on the type of object. A model for a building might have a degree of freedom as to how a door opens or closes and where the building is located, but that model—except perhaps in some stories—might not be expected to have a degree of freedom that allows a central spine to rotate and bend.

A rigging for a model refers to the user interface (logical or actual) for exercising the degrees of freedom. Using the rigging, an animator can specify a pose of the model for a still image and/or specify how the model is to move from pose to pose in an animation. Rigging is not part of the displayed scene, although there are user interfaces provided to animators that illustrate parts of the rigging, such as when animation is being edited. Models can be given various controllers, animation variables, and handles for an animator to manipulate various locations of the object's topology to create complex movements and motions.

For some models, a bone/joint system can be set up to deform various locations of the object's topology. For example, the bone/joint system can be connected to foot, ankle, knee, hip, and other leg locations of a humanoid model to provide the structure to make the humanoid model walk. Other types of information may also be "hung" on the object's topology to add further realism or additional control for the animator. In other words, information may be associated with a vertex, edge, span, or face of the mesh that forms to the object's topology. However, the above processes can be very involved and time consuming to simply generate a single model.

Additionally, a typical feature-length animation may require hundreds to thousands of models. This increases the production time and cost of the animation if each model may be required to be hand-created and setup. One possible solution can be to hand copy the information from one model to another. However, this process still requires an animator to place or "hang" the copied data onto the correct position of the new objects topology. Rarely is each character exactly the same, so each character's topology can have some differences that the animator has to deal with.

For example, an animated feature film might involve classes of objects or characters, with hierarchical subclasses. For example, there might be class of characters such as humans, with subclasses for warriors, elderly humans, tall humans, short stocky humans, children, adults, etc. and subclasses of subclasses, such as injured tall humans, etc. It could be that each of the different subclasses have separate models and separate rigging, but that can be a lot of work for an animation team.

Accordingly, what is desired are improved methods and apparatus for solving some of the problems discussed above, while reducing further drawbacks, some of which are discussed above.

BRIEF SUMMARY

In various embodiments, an animator can create or generate a model of an original object with or without rigging, using a computerized animation system and storing that model as a data structure usable by a rendering system. Models can have an assigned level wherein a model at one level will inherit elements of a model at a higher hierarchical level. Models thus can have controls that are themselves models, thus leading to a hierarchy of models and rigging usable for controlling models in an animation system wherein models correspond to elements or objects for which computer-generated graphics are to be rendered.

An animation system might also have functionality to evaluate models at one level and move elements of the models at one level to a higher level model. One approach to this uses an energy minimization process to determine which elements to move. The lower level models can then be of reduced complexity themselves and inherit the moved elements from the higher level model.

According to one embodiment, a computer-implemented method of enabling user-selectable models and rigging within a hierarchy in an animation tool is provided. The method typically includes having software read from storage a set of models wherein at least one model is associated with a first level and is associated with a model of another level such that the model at the lower level inherits elements, including displayable model elements and rigging controls, from the model at the higher level.

In other instances, elements of a model can be moved between models of the same level and changes to a higher level model are reflected in the lower level model when it is used.

According to another embodiment, a computer readable medium is provided that stores code for controlling one or more processors to enable functions described above.

In various embodiments, an animation object manipulation tool might read models from a model file, wherein a first model comprises visual elements and control elements, wherein a control element relates to a user interface control for altering one or more of the visual elements of its model and wherein at least one control element of a second model comprises a visual element of the first model. By accepting user input based on control elements of the first model and control elements of the second model, the tool can modify a state of the second model, wherein at least some of the state of the second model is inherited from state of the first model.

The first model might be higher level, coarser, model of an object, character, an inanimate object, a part of an animate object, or a geometric primitive. The second model might be is a lower level, more detailed model what the first model models. Additional levels are possible. Control elements might include translation controls, rotation controls, scaling controls, and bend controls. The model file might include data representing links between control elements of a higher level model and visual elements or control elements of a lower level model.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

DETAILED DESCRIPTION OF EXEMPLARY EMBODIMENTS

Figure 1:
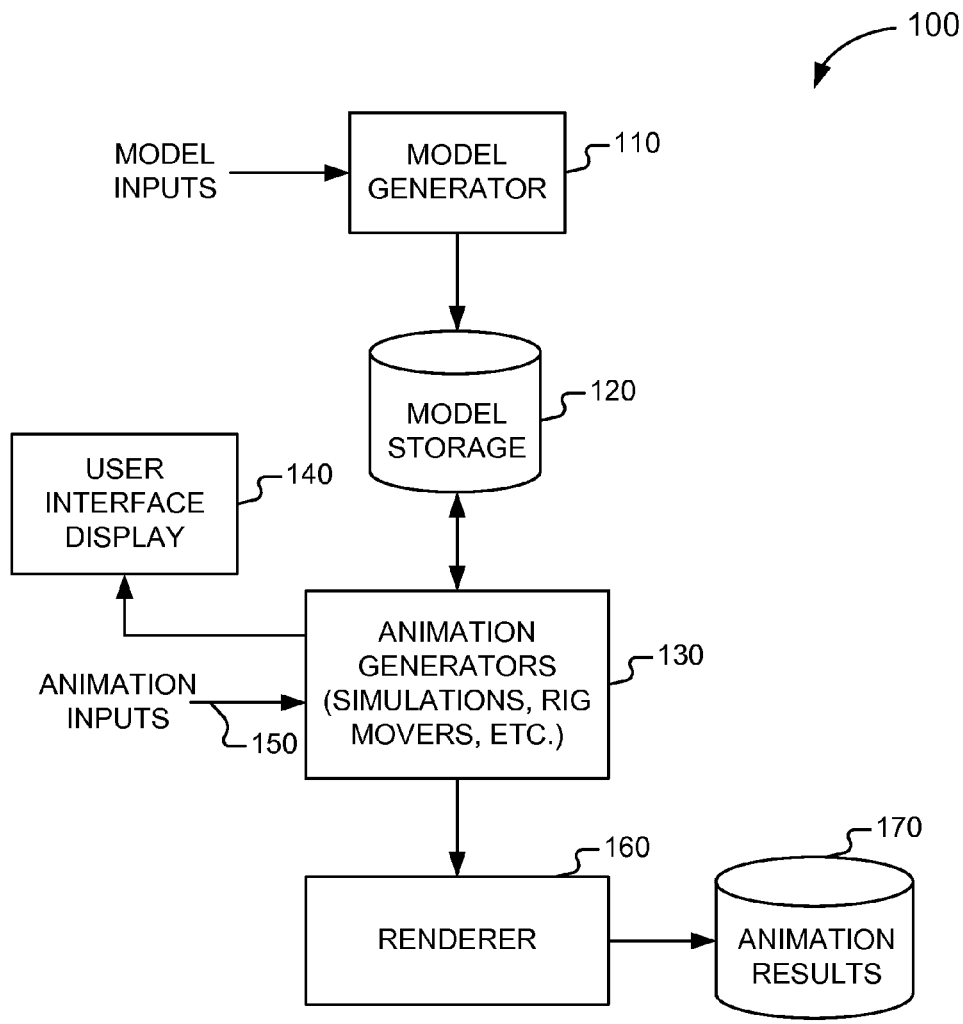
FIG. 1 illustrates an animation system, typically implemented using software and computers, that operates using hierarchical models and rigging according to one embodiment.

Techniques and tools can be implemented that assist in the production of computer animation and computer graphics imagery. In a typical operation, a user (referred to herein as an "animator" or "an animation artist", but it should be understood that such user might be creating single images or sequences of images, as well as other media) inputs a specification of objects, lighting, effects, camera location and orientation and the like. For some animation, the specifications provide location, orientation, etc. in a virtual three-dimensional ("3D") space using some coordinate system. A scene is a view from a camera location into that space and an image can be rendered that represents a two-dimensional array of pixel color values showing the view of the scene from that camera location. While an animator could manually specify the location of each small portion of each visible object in a scene, that could be tedious for a complex scene.

To simplify the specification of a scene or an animation sequence, some objects are represented by models. A model might be an automobile, with rigging that allows the animator to specify, for example, how the wheels of the automobile are to be turned and where the automobile is located. A model for a human-like biped character might have joints and rigging that would allow the animator to specify, using some user interface, a pose of the character and such pose might be stored in computer memory. In some animation systems, there are simulators, such as a physics simulator that might simulate movements that would occur for objects (using real or imagined laws of physics). Such simulators would provide poses that are compliant with input poses and simulation rules used.

In this manner, an animator can input a specification of a scene or animation and a rendering computer process can generate the corresponding desired image or image sequence.

A model may include information specifying vertices and edges or movable and/or poseable elements, point weight groups, shader variables, articulation controls, hair variables and styles, paint data, or the like. A rig associated with a model might provide user interface controls or object control elements that the animator can selected and modify to facilitate manipulation of objects in a scene according to their model. For example, if the model specifies that an elbow joint can move from ten degrees to 180 degrees, the object might be displayed on a screen where the animator can select a "handle" that would move the character's forearm somewhere to have an angle with the upper arm of ten degrees to 180 degrees, but the animator could not drag the forearm more than 180 degrees or detach it from the character (unless the model allows).

Ideally, the model for a character or an object is such that the details (rigging, shape of elements, surfaces, etc.) allow the animator to change, move, etc. the character or object in ways that seem natural or desirable to the animator. That way, the animator doesn't have to manually specify every detail. For example, the animator can move a biped's arms, legs, feet and face, but doesn't have to constantly specify the location of the biped's head so that it appears to stay attached to the biped's torso. Of course, with so many rules and requirements implied in the model, generating a model can be quite a bit of work.

Using the methods and apparatus described herein, an animator is provided with, and can use, models that are part of a model set comprising a hierarchy of models. For example, a model set might be designated as the model set for all characters in a feature film. At the root level (level 0), perhaps that model is for a character, with the next level (level 1) being for a specific type of character (e.g., biped, horse, dinosaur, car, bear, wagon) and then subsequent levels for more detailed models. For example, the biped model might have a few joints and some surface details, but the level 2 models might include different models for tall bipeds, hairy and short bipeds, six-armed bipeds, and the level 3 models might have even more specifics.

With a model hierarchy, lower level models (those with more detail) inherit elements of the higher level models. Thus, if the animator were to modify the biped model at level 1 so that the elbow joint could rotate through 360 degrees, when the animator was animating a specific tall biped using details on present in the level 3 model, the elements of the level 1 biped model would be available—the animator could move the character's elbow joint through 360 degrees.

As used herein, a rig is a set of object control elements specified for a set of one or more animation objects that may or may not be related to visual elements of the model that result in something that is part of a scene. Each object control element typically has an associated visual representation that may be displayed proximal to the object part with which that object control element has been associated. For example, the visual representation may be displayed directly on the object part or to the side of the object part with which it is associated. One example of a visual representation would be a slider for a control element designed to translate an object; another example would be a circle or other angle element for a control element designed to rotate an object. A visual representation of a control element can be purely functional. For example, a visual representation can provide an ability to manipulate an object and/or it can provide feedback on the extent of a current manipulation. An example of the latter would be an indicator showing the direction and amount of angular rotation made when a user selects a rotation control element and manipulates an object using that control element. A control element can include one or more animation control variables.

Different rigs can be constructed for the same set of animation objects. For example, different rigs may be constructed by an object animator, an object modeler or other user to perform different tasks. Also, the same rig can be associated with a different set of animation objects, such as different characters in the same or different animation frames. In certain aspects, a rig is modeless; that is, a rig may include an arbitrary mixture of object control elements that are typically used in different modes of manipulation in a model object manipulation tool. For example, a rig may at the same time include one or more control elements typically used in a translation mode and one or more control elements typically used in a rotation mode. When a user selects a rig, all of the object control elements specified for that rig are enabled for use in manipulating the associated object(s). For example, in certain aspects, all of the visual representations of the object control elements specified for that rig are enabled to be displayed proximal the object(s) so that no additional selection of object parts is necessarily required to determine which control elements are associated with the object(s). For example, a representation of an enabled control element may be displayed upon a mouse over of an object by the user, or it may be automatically displayed upon selection of the rig. Alternately, an enabled control element may be displayed upon a selection of an object. The user may manipulate the object(s) using a displayed visual representation of an object control element.

As used herein a control element includes any element usable in an animation object manipulation tool or similar tool and which provides an ability to manipulate a model object and/or provides feedback on the extent of a current manipulation. A control element might include, for example, animation control variables. A control element can be of any type, e.g., usable in a particular mode of manipulation. For example, object control element types can include translation elements, rotate elements, scaling elements, and bend elements. It should be appreciated that the model objects with which a control element may be associated include animate objects and/or inanimate objects in a scene. Specific examples include characters in a scene.

FIG. 1 illustrates an animation system 100 that might be used to generate an animation. Various components of animation system 100 might be implemented in software, hardware or a combination thereof. It should be understood, even if not explicitly displayed, that functionality can be represented by programming instructions stored in memory suitable for being read by a processor that in turn executes those programming instructions.

As illustrated, animation system 100 comprises a model generator 110 that generates models from model inputs and stores them in model storage. The model inputs can be inputs from a user interface, from another computer process, from storage or other sources. An animation generator can read and modify these models, present data, objects, controls, etc. on a user interface display 140 and receive animation inputs 150 in order to determine which models to use, where, how and how to manipulate them to form particular scenes. This data is provided to a renderer 160 that generates animation results stored in storage 170, as might be a sequence of animated images.

Using animation system 100, an animator can generate models and animation using those models.

Figure 2:
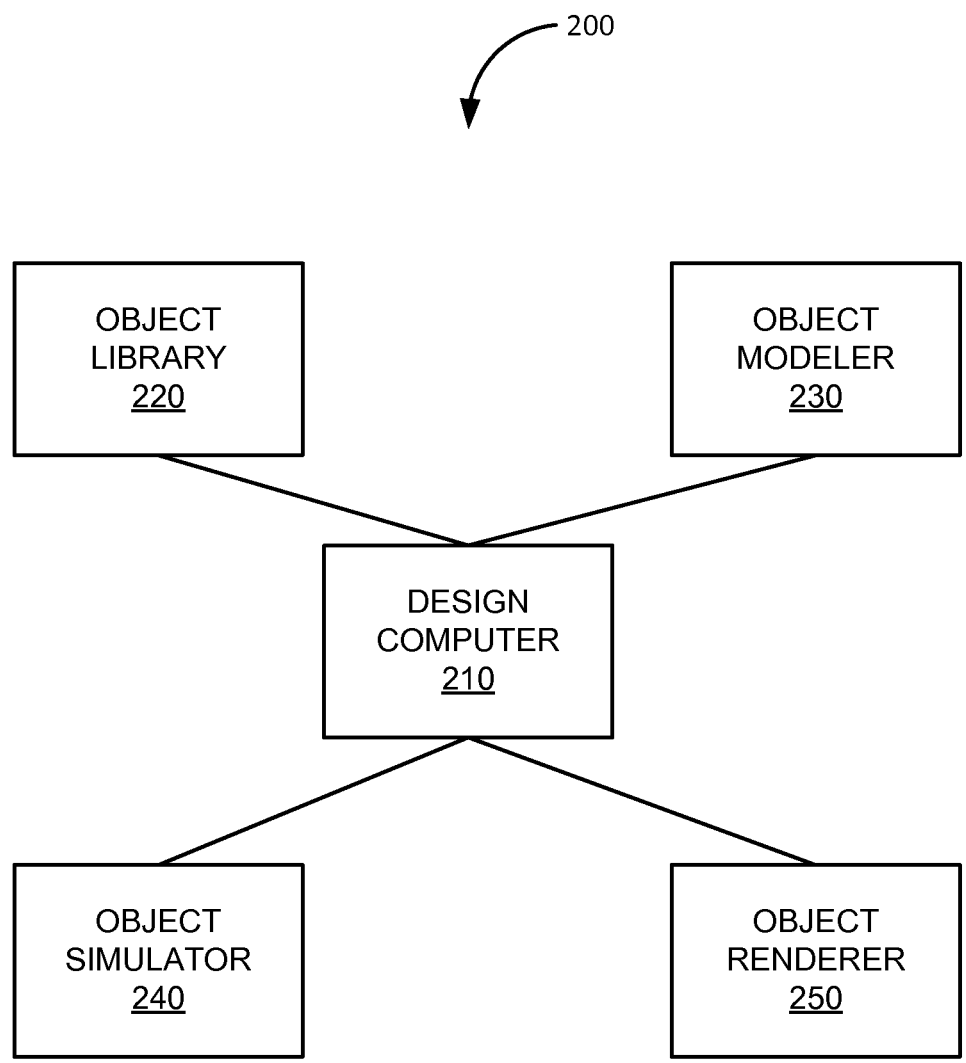
FIG. 2 is a block diagram of components of a system that may be used to practice embodiments of the present invention.

FIG. 2 is a simplified block diagram of a related system 200 for creating computer graphics imagery and animation that may incorporate embodiments of those inventions found within this disclosure. In this example, system 200 includes a design computer 210, an object library 220, an object modeler 230, an object simulator 240, and an object renderer 250. Design computer 210 can be a desktop computer, laptop, workstation, mainframe, cluster, or the like. Object library 220 can be a database configured to store information related to objects that may be designed, posed, animated, simulated, rendered, or the like. Object modeler 230 can be hardware and/or software configured to model objects. Object modeler 230 may generate 2D and 3D object data to be stored in object library 220. Object simulator 240 can be hardware and/or software configured to simulate objects. Object simulator 240 may generate simulation data using physically-based numerical techniques. Object renderer 250 can be hardware and/or software configured to render objects. For example, object renderer 250 may generate still images, animations, motion picture sequences, or the like of objects stored in object library 220.

Figure 3:
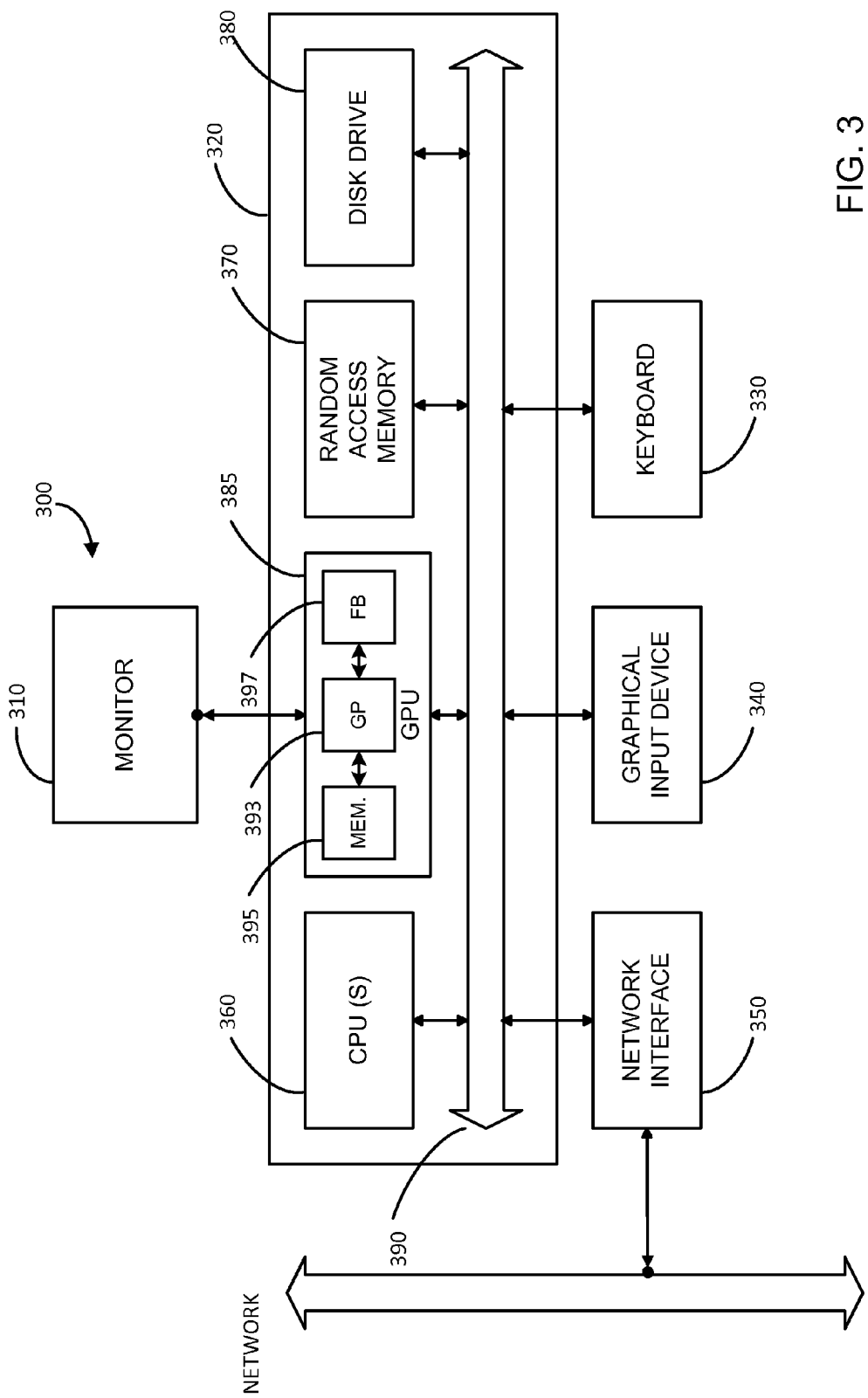
FIG. 3 is a block diagram of elements of a computer system that may be used to practice embodiments of the present invention.

FIG. 3 is a block diagram of a computer system 300 that may be used to implement or practice various embodiments of an invention whose teachings may be presented herein. FIG. 3 is merely illustrative of a general-purpose computer system or specific information processing device for an embodiment incorporating an invention whose teachings may be presented herein and does not limit the scope of the invention as recited in the claims. One of ordinary skill in the art would recognize other variations, modifications, and alternatives.

In one embodiment, computer system 300 can include a monitor 310, a computer 320, a keyboard 330, a user input device 340, computer interfaces 350, and/or the like. Monitor 310 may typically include familiar display devices, such as a television monitor, a cathode ray tube (CRT), a liquid crystal display (LCD), or the like. Monitor 310 may provide an interface to user input device 340, such as incorporating touch screen technologies.

Computer 320 may typically include familiar computer components, such as a processor 360 and one or more memories or storage devices, such as a random access memory ("RAM") 370, one or more disk drives 380, a graphics processing unit ("GPU") 385, and/or the like. Computer 320 may include a system bus 390 interconnecting the above components and providing functionality, such as inter-device communication.

In further embodiments, computer 320 may include one or more microprocessors (e.g., single core and multi-core) or micro-controllers, such as PENTIUM, ITANIUM, or CORE 2 processors from Intel of Santa Clara, Calif. and ATHLON, ATHLON XP, and OPTERON processors from Advanced Micro Devices of Sunnyvale, Calif. Further, computer 320 may include one or more hypervisors or operating systems, such as WINDOWS, WINDOWS NT, WINDOWS XP, VISTA, or the like from Microsoft or Redmond, Wash., SOLARIS from Sun Microsystems, LINUX, UNIX, and UNIX-based operating system.

In various embodiments, user input device 340 may typically be embodied as a computer mouse, a trackball, a track pad, a joystick, a wireless remote, a drawing tablet, a voice command system, an eye tracking system, or the like. User input device 340 may allow a user of computer system 300 to select objects, icons, text, user interface widgets, model or rigging elements or handles, or other user interface elements that appear on monitor 310 via a command, such as a click of a button or the like.

In some embodiments, computer interfaces 350 may typically include a communications interface, an Ethernet card, a modem (telephone, satellite, cable, ISDN), (asynchronous) digital subscriber line (DSL) unit, FireWire interface, USB interface, or the like. For example, computer interfaces 350 may be coupled to a computer network, to a FireWire bus, a USB hub, or the like. In other embodiments, computer interfaces 350 may be physically integrated as hardware on the motherboard of computer 320, may be implemented as a software program, such as soft DSL or the like, or may be implemented as a combination thereof.

In various embodiments, computer system 300 may also include software that enables communications over a network, such as the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 300.

RAM 370 and disk drive 380 are examples of machine-readable articles or computer-readable media configured to store information, such as computer programs, executable computer code, human-readable source code, shader code, rendering engines, or the like, and data, such as image files, models including geometrical descriptions of objects, ordered geometric descriptions of objects, hierarchies of models, procedural descriptions of models, scene descriptor files, or the like. Other types of computer-readable storage media or tangible machine-accessible media include floppy disks, removable hard disks, optical storage media such as CD-ROMS, DVDs and bar codes, semiconductor memories such as flash memories, read-only-memories (ROMS), battery-backed volatile memories, networked storage devices, or the like.

In some embodiments, GPU 385 may include a conventional graphics processing unit. GPU 385 may include one or more vector or parallel processing units that may be user programmable. Such GPUs may be commercially available from NVIDIA, ATI, and other vendors. In this example, GPU 385 can include one or more graphics processors 393, a number of memories and/or registers 395, and a number of frame buffers 397.

As explained, FIG. 3 is merely representative of a general-purpose computer system or specific data processing device capable of implementing or incorporating various embodiments of an invention presented within this disclosure. Many other hardware and/or software configurations may be apparent to the skilled artisan which are suitable for use in implementing an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may include techniques described above as implemented upon a chip or an auxiliary processing board.

Figure 4:
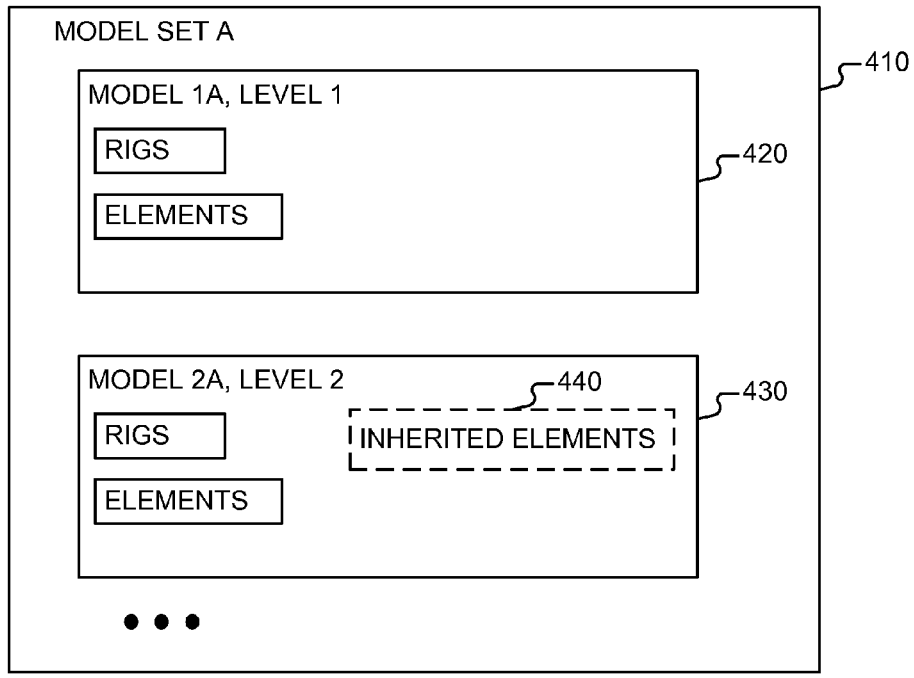
FIG. 4 illustrates data structures that might be stored in computer memory to represent a model set comprising a hierarchy of models.

FIG. 4 illustrates a model set comprising a hierarchy of models. While only a few levels of models are shown, it should be understood that the invention is not so limited. As represented there, a model set A 410 comprises at leave a model 1A 420 at level 1 and a model 2A 430 at level 2. As model 2A is at a level of detail below level 1, it can inherit elements 440 of model 1A. In some animation systems, an analysis of a model set is performed and some elements, such as elements common to all models at a given level, can be moved up to be instead elements of a higher level model, thus reducing complexity.

As an example of a model set, a level 0 model might be an outer shell of a human character, while level 1 is a rough model of basic parts, level 2 is a recognizable model of the character, and level 3 include skin wrinkles that can be controlled by the animator. In another example, level 1 is a model for an upper lip and has 13 control points (that might be manipulable using user interface affordances such as handles or drag points), while the level 2 model includes a scar and 25 control points (including the 13 inherited from the level 1 model). A level 3 model might be used at the collision level and have 100+ control points so that (including the 25 inherited control points). For example, the animator can specify and control face wrinkling or other fine details using the level 3 model and mouth opening and closing can be specified using the level 3 model or the level 1 model.

As another example, a model might comprise a stack of four blocks that are free to rotate around a central axis. The desired rotation might be specified using a widget to get from the user a specific rotation. With a hierarchy of models, a model can be used as a user interface device to manipulate a lower level model. The data structures used for models would include links between models that link elements of a higher level model and elements of a lower level model. In effect, this would allow a model to be used like a widget is used.

Figure 5:
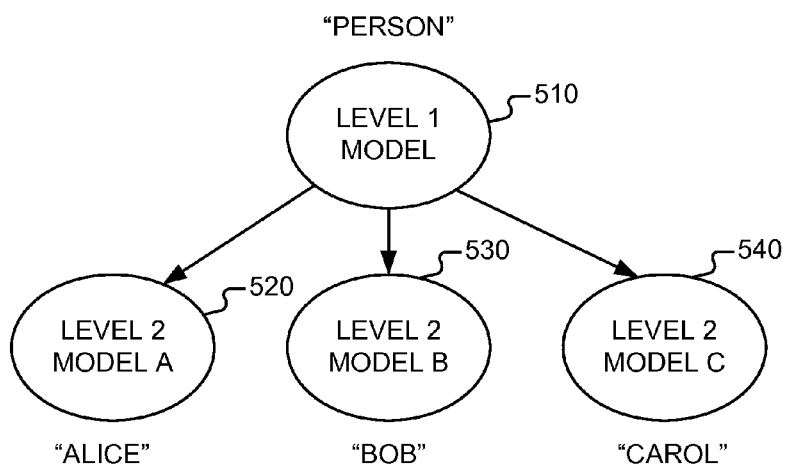
FIG. 5 illustrates a model hierarchy.

Details of a model might also be moved from one model to another, to avoid having to recreate parts of a model. As illustrated in FIG. 5, a level 1 model 510 for a "person" object can be inherited by a level 2 model 520 for one character (Alice) as well as for a level 2 model 530 for another character (Bob) and for a level 2 model 540 for another character (Carol).

Edits for a rig can be moved down, up and sideways (among peer models), for example. Thus, sculpting done on one level can be moved to another model or level. In some cases, a model will include a definition of what can be moved sideways. In some embodiments, however, there is no sideways transfer ability.

Figure 6:
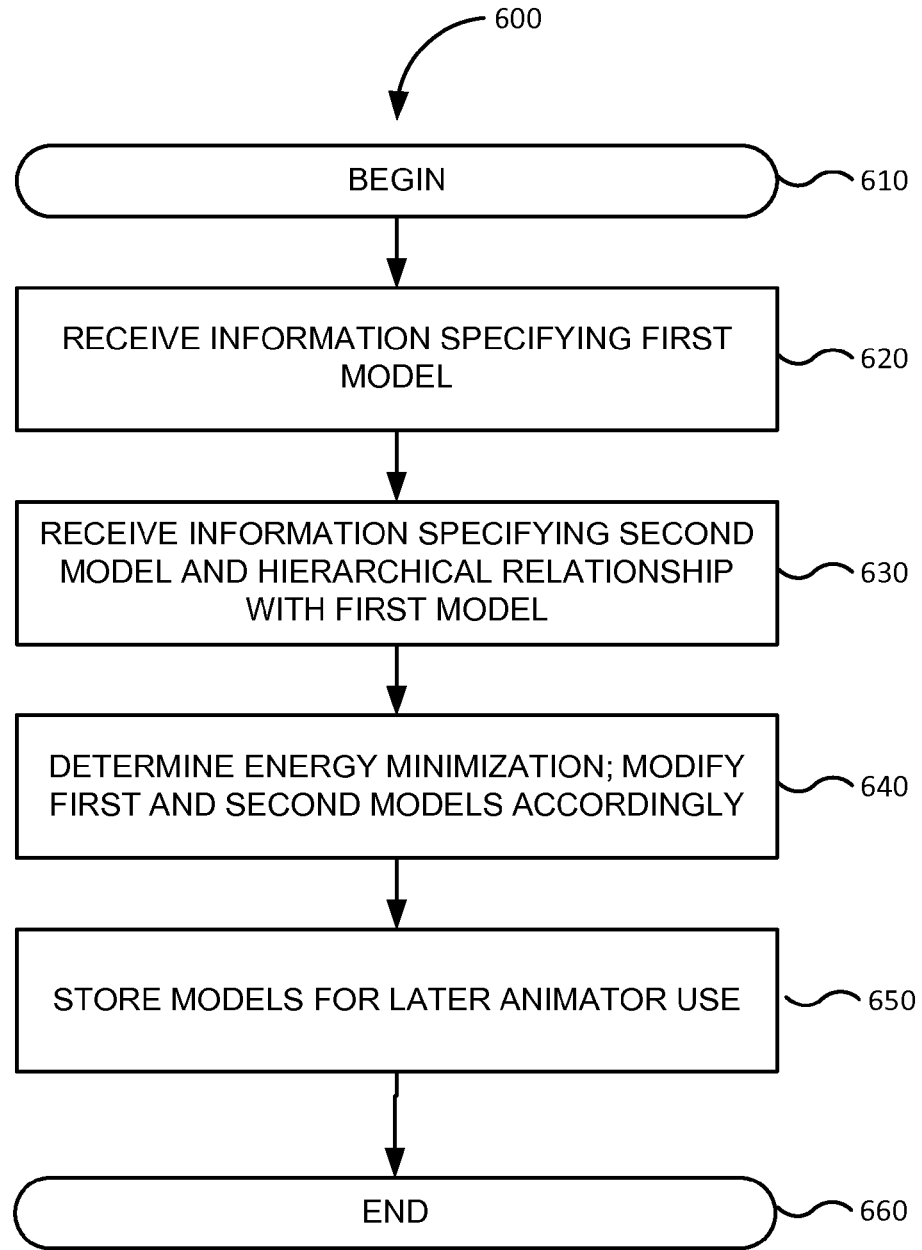
FIG. 6 is a simplified flowchart of a method in various embodiments for developing a model set.

FIG. 6 is a simplified flowchart 600 of a method in various embodiments for developing a model set. The processing depicted in FIG. 6 may be performed by software modules (e.g., instructions or code) executed by a processor of a computer system, by hardware modules of an electronic device, or combinations thereof.

As illustrated there, a method might begin 610 with receiving information specifying a first model at step 620. Then, at step 630, an animation system might receive information specifying a second model and a hierarchical relationship with the first model. For example, the second model might be identified as being one level down from the first model, such that the second model inherits elements of the first model. Note that because the second model inherits features of the first model, the first model might effectively serve as a widget for indicating modifications of the first model.

In some embodiments, the animation system can modify the models to "minimize energy" and simplify the models by moving elements of models around (step 640). The models can then be stored (650) for later use in animations. The process can end (660) or repeat for additional models.

Figure 7:
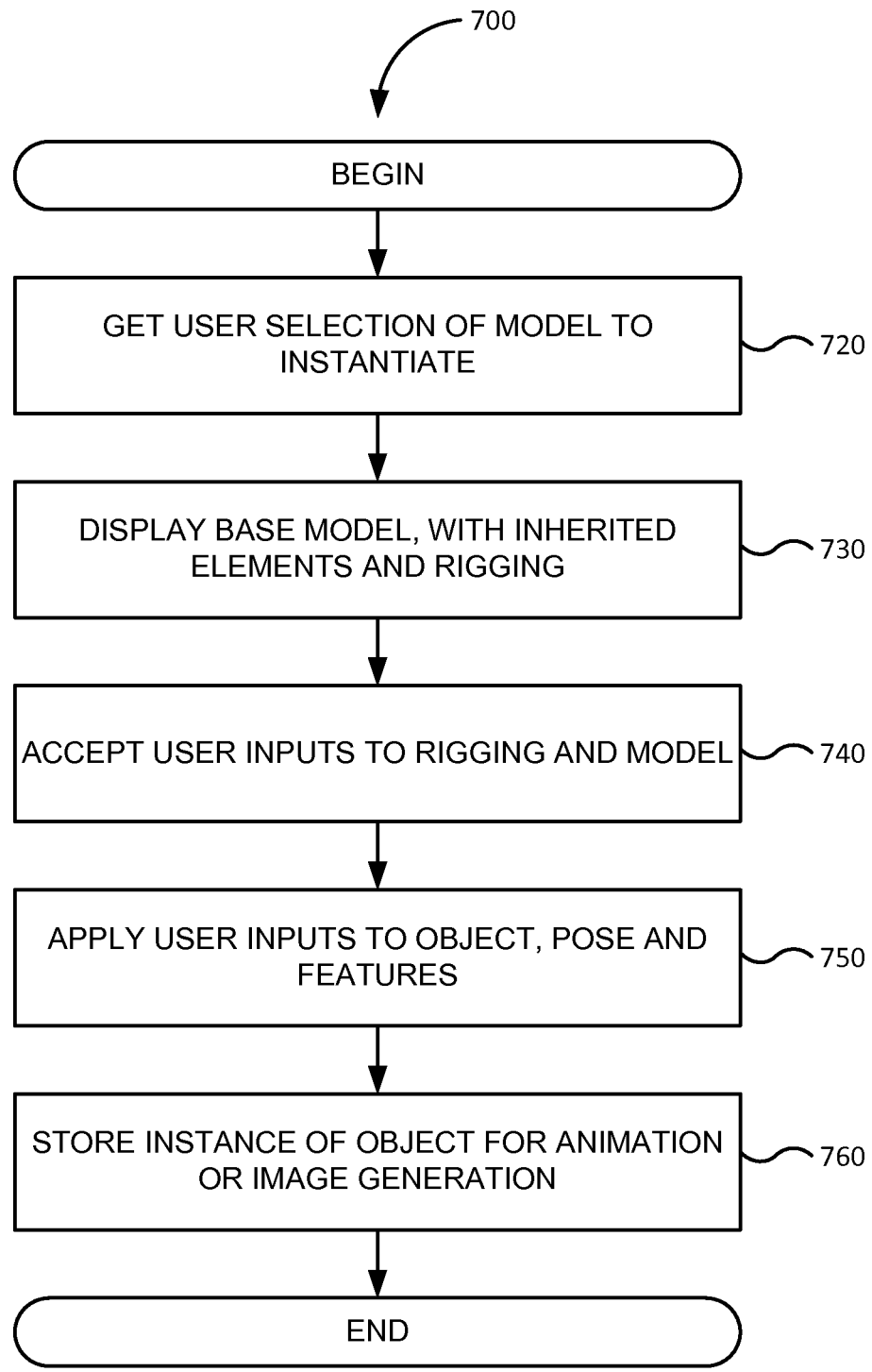
FIG. 7 is a simplified flowchart of a method in various embodiments for using a model set comprising a hierarchy of models for animation.

FIG. 7 is a simplified flowchart 700 of a method in various embodiments for using a model set comprising a hierarchy of models for animation. To begin, an animation system might get from a user a select of a model to instantiate (step 720) and display a base model, with inherited elements and rigging (step 730) inherited from an higher level model, if any. Then, the animation system would accept user inputs to the rigging and model (step 740) for that instantiated model. Those would be inherited by lower level models.

Once the user inputs are obtained, the animation system can apply the user inputs to the object, its pose and features (step 750). The instance of the object can then be stored (step 760) for animation or image generation. The process can be repeated for other objects.

Figure 8:
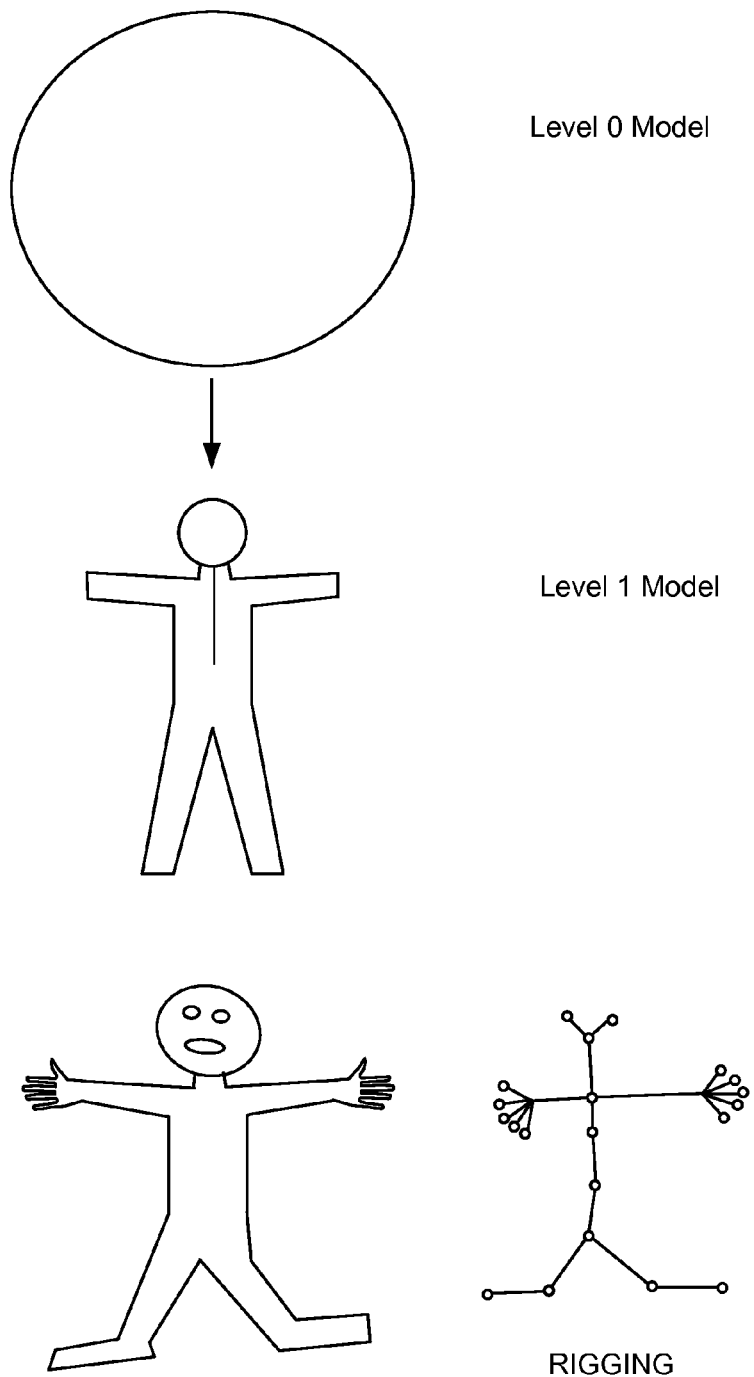
FIG. 8 illustrates various levels of models.

FIG. 8 illustrates various levels of models. The level 0 model might just be an outer shell. The level 1 model might be a "person" shell, while the level 2 model might comprise a featured person shell with rigging for arms, eyes, torso, legs, etc.

Figure 9:
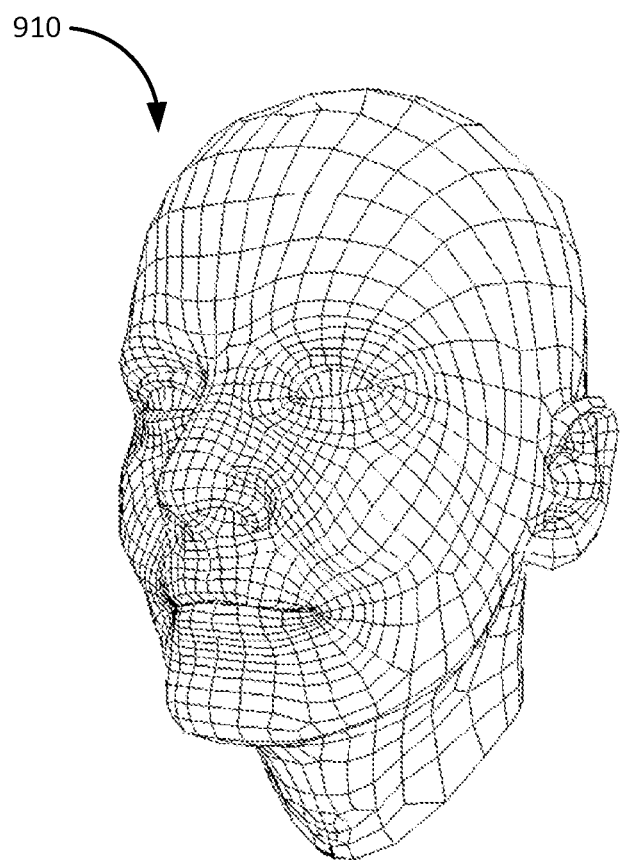
FIG. 9 illustrates a detailed model for a face as might be used in a model set.

FIG. 9 illustrates a detailed model for a face as might be used in a model set. This might be a lower level (more detailed) model that might inherit from models such as those shown in FIG. 8. For example, if the level 2 model is modified such that the rigging of the eyes are asymmetric relative to the center of the face, mesh 910 might automatically reflect that asymmetry. Mesh 910 can be created or modeled as a collection of faces (e.g., triangles, quadrilaterals, or other polygons), formed by interconnecting a collection of vertices. Any number of polygons and vertices may be used to form mesh 910. The number of polygons may be dependent on user preference, the desired topology, geometry, realism, detail, or the like.

Motion of a model associated with mesh 910 may be realized by controlling mesh 910, or by controlling higher level models. In addition to controlling character deformations, information can be "attached to" the mesh to provide other functional and/or decorative purposes. For example, mesh may be connected to skeletons, character rigging, or other animations controls and avars used to animate, manipulate, or deform the model via the mesh. Further, fields of data and/or variables specifying color, shading, paint, texture, etc. can be located at certain vertices or defined over surfaces of the mesh. Constructing the mesh and placing all of this information on the mesh can be a time-consuming process. This can be simplified using models that have controls that are themselves models, lending to the ability to create a hierarchy of models.

In various embodiments, new models can be created and existing models can be more readily updated using techniques of this disclosure that allow animators to overcome some of the timing constraints involved in creating models. Additionally, the time and effort put into designing one model can be preserved allowing the prior work and effort performed by the animator to be shared with or copied to another model. In some embodiments, a standard or uniform topology can be created that allows information present at or on a mesh to be shared with another mesh. Fitting the standard topology to objects can reduce the time required to create new models, or the update existing models at later stages of the production process. Thus, animation controls, rigging, shader and paint data, etc. can be authored once on a character, and shared or transferred to different version of the same character or to another character fitted with the authored topology.

Thus, in some instances, a model inherits a higher level model and changes to the higher level model affect the lower level model, while in other instances, one model has a static copy of elements of another model.

Various embodiments of any of one or more inventions whose teachings may be presented within this disclosure can be implemented in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for implementing in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A computer-implemented method of enabling user-selectable object control elements in an animation object manipulation tool, the method comprising:
reading a first model from a model file, wherein the first model comprises visual elements and control elements, wherein a control element of the first model relates to a user interface control for altering one or more of the visual elements of the first model;
reading a second model from the model file, wherein the second model comprises visual elements and control elements, wherein one or more of the visual elements and/or the control elements of the second model are inherited from the first model, and wherein a first control element of the first model is linked to a second control element of the second model that is inherited from the first model, wherein the second control element is associated with a second visual element of the second model;
reading a third model from the model file, wherein the third model comprises visual elements and control elements, wherein one or more of the visual elements and/or the control elements of the third model are inherited from the first model, and wherein a first control element of the first model is linked to a third control element of the third model that is inherited from the first model, wherein the third control element is associated with a third visual element of the third model;
receiving user input indicating a first modification to the first control element of the first model; and
modifying the second control element of the second model and the third control element of the third model based on the first modification to the first control element of the first model.

2. The method of claim 1, wherein the first model is a coarse model of a character and the second model is a more detailed model of the character, and wherein the first model is at a first level that is higher than a second level of the second model.

3. The method of claim 2, wherein the second model is at the second level that is higher than a third level of the third model, and wherein the first control element of the first model is linked to the third control element of the third model via the second control element of the second model.

4. The method of claim 1, wherein control elements include translation controls, rotation controls, scaling controls, and bend controls.

5. The method of claim 2, wherein the second model and the third model are at the second level, and wherein the first control element of the first model is directly linked to the third control element of the third model.

6. The method of claim 1, wherein the first model and the second model correspond to models for one of an inanimate object or a part of an animate object or a geometric primitive.

7. The method of claim 1, further comprising manipulating a modeled animation object responsive to user selection of the first control element.

8. A non-transitory computer-readable medium comprising program code executable by a processor, the program code comprising code for:
reading a first model from a model file, wherein the first model comprises visual elements and control elements, wherein a control element of the first model relates to a user interface control for altering one or more of the visual elements of the first model;
reading a second model from the model file, wherein the second model comprises visual elements and control elements, wherein one or more of the visual elements and/or the control elements of the second model are inherited from the first model, and wherein a first control element of the first model is linked to a second control element of the second model that is inherited from the first model, wherein the second control element is associated with a second visual element of the second model;
reading a third model from the model file, wherein the third model comprises visual elements and control elements, wherein one or more of the visual elements and/or the control elements of the third model are inherited from the first model, and wherein a first control element of the first model is linked to a third control element of the third model that is inherited from the first model, wherein the third control element is associated with a third visual element of the third model;
receiving user input indicating a first modification to the first control element of the first model; and
modifying the second control element of the second model and the third control element of the third model based on the first modification to the first control element of the first model.

9. The non-transitory computer-readable medium of claim 8, wherein the first model is a coarse model of a character and the second model is a more detailed model of the character, and wherein the first model is at a first level that is higher than a second level of the second model.

10. The non-transitory computer-readable medium of claim 9, wherein the second model is at the second level that is higher than a third level of the third model, and wherein the first control element of the first model is linked to the third control element of the third model via the second control element of the second model.

11. The non-transitory computer-readable medium of claim 8, wherein control elements include translation controls, rotation controls, scaling controls, and bend controls.

12. The non-transitory computer-readable medium of claim 9, wherein the second model and the third model are at the second level, and wherein the first control element of the first model is directly linked to the third control element of the third model.

13. The non-transitory computer-readable medium of claim 8, wherein the first model and the second model correspond to models for one of an inanimate object or a part of an animate object or a geometric primitive.

14. The non-transitory computer-readable medium of claim 8, further comprising program code for manipulating a modeled animation object responsive to user selection of the first control element.

15. A system for enabling user-selectable object control elements in an animation object manipulation tool, the system comprising:
  a processor;
  a data store coupled to the processor, for storing a plurality of data sets corresponding to models, wherein a model comprises visual elements and control elements, wherein a control element relates to a user interface control for altering one or more of the visual elements of its model, the plurality of data sets corresponding to at least a first model and a second model; and
  an instruction memory coupled to the processor, the memory configured to store a set of instructions executable by the processor, comprising code for:
    reading a first model from the data store, wherein the first model comprises visual elements and control elements, wherein a control element of the first model relates to a user interface control for altering one or more of the visual elements of the first model;
    reading a second model from the data store, wherein the second model comprises visual elements and control elements, wherein one or more of the visual elements and/or the control elements of the second model are inherited from the first model, and wherein a first control element of the first model is linked to a second control element of the second model that is inherited from the first model, wherein the second control element is associated with a second visual element of the second model;
    reading a third model from the data store, wherein the third model comprises visual elements and control elements, wherein one or more of the visual elements and/or the control elements of the third model are inherited from the first model, and wherein a first control element of the first model is linked to a third control element of the third model that is inherited from the first model, wherein the third control element is associated with a third visual element of the third model;
    receiving user input indicating a first modification to the first control element of the first model; and
    modifying the second control element of the second model and the third control element of the third model based on the first modification to the first control element of the first model.

16. The system of claim 15, wherein the first model is a coarse model of a character and the second model is a more detailed model of the character, and wherein the first model is at a first level that is higher than a second level of the second model.

17. The system of claim 16, wherein the second model is at the second level that is higher than a third level of the third model, and wherein the first control element of the first model is linked to the third control element of the third model via the second control element of the second model.

18. The system of claim 15, wherein control elements include translation controls, rotation controls, scaling controls, and bend controls and wherein the first model and the second model correspond to models for one of an inanimate object or a part of an animate object or a geometric primitive.

19. The system of claim 16, wherein the second model and the third model are at the second level, and wherein the first control element of the first model is directly linked to the third control element of the third model.

20. The system of claim 15, further comprising program code for manipulating a modeled animation object responsive to user selection of the first control element.

21. The method of claim 3, further comprising:
  receiving user input indicating a second modification to the second control element of the second model; and
  modifying the third control element of the third model based on the second modification to the second control element of the second model.

* * * * *